United States Patent
Hildebrand

(10) Patent No.: US 6,435,532 B2
(45) Date of Patent: Aug. 20, 2002

(54) REVOLVING SHACKLE

(75) Inventor: Curt C. Hildebrand, Casper, WY (US)

(73) Assignee: Tera Manufacturing, Sandy, UT (US)

( * ) Notice: Subject to any disclaimer, the term of this patent is extended or adjusted under 35 U.S.C. 154(b) by 0 days.

(21) Appl. No.: 09/899,864

(22) Filed: Jul. 5, 2001

Related U.S. Application Data

(63) Continuation of application No. 09/352,264, filed on Jul. 13, 1999, now abandoned.

(51) Int. Cl.[7] .............................................. B60G 11/07
(52) U.S. Cl. ................................................ 280/124.175
(58) Field of Search ..................... 280/124.175, 124.17; 267/267, 266, 271; 403/52, 53, 54, 119, 150, 157

(56) References Cited

U.S. PATENT DOCUMENTS

| | | | | |
|---|---|---|---|---|
| 1,327,746 A | * | 1/1920 | Trott | |
| 2,323,065 A | * | 6/1943 | Martins | 267/17 |
| 2,917,304 A | * | 12/1959 | Nilsson | 267/11 |
| 3,918,125 A | * | 11/1975 | Strandine et al. | 17/45 |
| 4,361,024 A | * | 11/1982 | Haldric | 72/379 |
| 4,365,909 A | * | 12/1982 | Stephan | 403/157 |
| 4,420,171 A | * | 12/1983 | Raidel | 280/682 |
| 5,007,660 A | * | 4/1991 | Orndorff, Jr. | 280/715 |
| 5,018,899 A | * | 5/1991 | Kuribara et al. | 403/57 |
| 5,137,300 A | * | 8/1992 | Walton | 280/718 |
| 5,305,844 A | * | 4/1994 | Ducote | 180/24.01 |
| 5,562,348 A | * | 10/1996 | Link | 384/474 |
| 5,580,180 A | * | 12/1996 | DeBisschop et al. | 403/157 |
| 5,873,581 A | * | 2/1999 | Yale | 280/5.519 |
| 5,984,790 A | * | 11/1999 | Sekine et al. | 464/134 |
| 5,988,614 A | * | 11/1999 | Sturmon | 267/292 |
| 6,019,384 A | * | 2/2000 | Finck | 280/124.17 |
| 6,179,702 B1 | * | 1/2001 | Hazenbroek | 452/188 |
| 6,186,694 B1 | * | 2/2001 | Couallier et al. | 403/225 |
| 6,247,689 B1 | * | 6/2001 | Haesle et al. | 267/271 |

* cited by examiner

Primary Examiner—Lanna Mai
Assistant Examiner—Paul Royal, Jr.
(74) Attorney, Agent, or Firm—Christensen O'Connor Johnson Kindness PLLC

(57) ABSTRACT

An apparatus and method of articulating a vehicle is disclosed using a rotatable shackle connected to the frame and the suspension system of the vehicle. As one side of an axle is moved to a different levels from the other side, the shackle rotates, allowing the vehicle to articulate and assisting the spring eye of a leaf spring suspension system to remain substantially in its resting position. Pivoting connections may be provided where the rotatable shackle is connected to the frame, where the rotatable shackle is connected to the suspension system, and within the rotatable shackle itself. The rotatable shackle is self supporting and may include a bushing to receive a portion of the rotatable shackle.

15 Claims, 8 Drawing Sheets

REVOLVING SHACKLE

CROSS REFERENCE TO RELATED APPLICATION

The present application is a continuation of U.S. patent application Ser. No. 09/352,264 filed Jul. 13, 1999, entitled "REVOLVING SHACKLE", now abandoned which is incorporated herein by this reference.

FIELD OF THE INVENTION

The invention generally relates to structures and methods for increasing articulation in a vehicle, and more particularly, to hinged shackles for connecting leaf spring suspension assemblies to the frame of an off road vehicle.

BACKGROUND

Vehicles designed, built and marketed for off road use are increasingly being driven in more severe off road applications, while also being driven on paved highways and streets. One type of more severe off road driving is "rock crawling," which is commonly referred to as slowly driving a four wheel drive vehicle over through or between natural or even man made obstacles of a wide variety of shapes, angles, heights, widths, depths, compositions, etc. Such natural obstacles may include rocks, gulleys, ravines, stream beds, inclines or drops, among other things. Rock crawling refers not only to traversing the typically uneven rock surfaces, but also a variety of natural and man made surface material, including gravel, sand, dirt, concrete or metal barriers, and vegetation including exposed roots and tree stumps.

Rock crawling, and other types of off road use, can place severe demands on the suspension system to the vehicle. To maximize traction and control, it is generally advantageous to maintain each tire in full contact with the surface being driven, or at least as many tires and as much of each tire as possible. Similarly, it is also generally advantageous to keep the weight of the vehicle evenly distributed over each of the tires, or at least as much as possible. Because each axle of most non-military off road vehicles extend to at least one wheel on each side, driving on an uneven surface often means one wheel is significantly lower than the other, resulting in one or more tires losing maximum contact, or even being lifted off the surface. This is an even greater issue when the front and rear axles are at different levels or even at different angles. The relative ability of a vehicle to keep the tires on the ground during such maneuvering is commonly referred to as the articulation of the vehicle.

Off road vehicles commonly employ either a leaf spring or a coil spring suspension system to suspend the vehicle over the axles. Generally, in a leaf spring suspension system, a series of elongated bands of metal, or leaves, of varying lengths are stacked and banded together. One end of the assembly is bolted or otherwise fixed to the bottom of the vehicle, typically towards the center of the vehicle and away from the axle to be suspended. In a stock configuration, the leaves are commonly positioned under the axle, with a shallow U-shaped arc extending towards the outside of the vehicle. The end of the leaves near the outside of the vehicle typically terminates with a spring eye that allows a connection to a movable bar or shackle or other device that in turn is connected to the vehicle. One such leaf spring assembly is installed near each wheel. When at rest or under compression, the conventional leaf spring assembly typically presses the shackle up against the vehicle frame.

During compression of the leaf spring, this type of suspension allows the leaf spring to flatten and move toward the direction of the shackle. When the leaf spring is required to droop, or stretch as far as possible, it is restricted by the flex of the leaf spring itself. For this type of primarily vertical suspension, the bolted inner end of the leaf spring and the plates that make up the shackle limit the amount the leaf spring assembly can move.

The conventional leaf spring assembly is limited in articulation, e.g., when one side of the axle compresses and the other side does not compress as much, does not compress at all, or is required to droop. The axle is no longer level and the vehicle tilts. Because the leaf spring at the inner end is bolted and at the outer end has only limited vertical and forward movement, but no lateral movement, the leaves themselves must twist or flex to try to accommodate the changing lateral angle between the axle and the vehicle. Reliance on the leaf spring twisting not only limits articulation, but also can cause metal fatigue in the leaf spring assembly and result in premature failure.

To increase articulation, several modifications to leaf spring assemblies have been attempted, generally by allowing the leaf spring to more readily drop away from the frame. For example, in one configuration, the inner end of the leaf spring remains bolted to the vehicle frame and the spring eye remains connected to a shackle. However, the arm of the shackle is lengthened, which provides more droop. Although this configuration provides enhanced vertical suspension, it still relies on the leaf springs to twist to provide articulation. Also, lengthening the arm of the shackle generally reduces the lateral stability of the vehicle, particularly at higher speeds.

In another design, known as a folded hinged shackle, the shackle has a first arm with one end connected to the vehicle and the other end pivotally connected to a second arm, that in turn is connected to the spring eye of the leaf spring. When at rest or under compression, the folded hinged shackle is pressed up against the vehicle and the leaf springs primarily provide for compression. When the leaf spring is required to droop, however, the folded hinged shackle opens, providing increased droop. Again, articulation is limited by the amount of twisting of the leaf springs.

Another attempt to increase articulation is commonly referred to as a "buggy spring" suspension. Again, the end of the leaf spring towards the center of the vehicle is bolted to the vehicle frame. The outer shackle is replaced essentially with a second, shorter leaf spring assembly. The end of the shorter leaf spring assembly towards the center of the vehicle is bolted to the vehicle between the spring eye of the main leaf spring and the axle. The end of the shorter leaf spring assembly near the outside of the vehicle is connected to the spring eye of the main leaf spring by a conventional shackle design. This buggy spring assembly provides another level of vertical suspension and may provide more droop. It also increases articulation, as both the main and the shorter leaf springs will twist somewhat. However, articulation is still limited by the amount of twisting of the leaf springs. As with lengthening the shackle arm, replacing the shackle with a second leaf spring assembly generally reduces the lateral stability of the vehicle, particularly at higher speeds.

A more complicated assembly to try to increase articulation, known as a "four link" suspension, is commonly installed to greatly increase droop of the rear axle. This assembly again has the inner end of the leaf spring bolted to the vehicle, but is inverted, i.e., the leaf spring forms a concave shape opening downward. The outer end of the leaf spring extends only just past the axle and is not fixed to another component. Rather, it merely rests on top of the axle. To protect the vehicle from the slapping of the leaf springs, a small bumper is commonly inserted on the vehicle frame between the two ends of the leaf spring. The relative vertical drop is controlled by a four arm link system, with two arms for each side of the axle. One arm is pivotally connected to the outer end of the vehicle and extends to rest under the axle. A shorter arm is pivotally connected toward the inside of the longer arm and extends to suspend above the axle. The inverted leaf springs provide compression and the arms can be set to provide little or no pressure, resulting in very large amounts of droop if both sides of the axle are required to droop. This four link assembly is commonly used in faster off road races with big, fast jumps requiring large droop of both rear wheels. The rear axle essentially is momentarily free hanging, supporting little or no weight of the vehicle. In part because one end of the leaf spring is unattached, articulation is increased, although it is still limited by the amount of twist of the leaf springs. Again, the four link system reduces the lateral stability of the vehicle, particularly at the higher speeds on the road.

A more simple approach to increase articulation is to simply move the leaf springs of a conventional leaf spring assembly from under the axle to over the axle. This is commonly referred to as a "spring over" suspension or a "lift," as it literally lifts the body of the vehicle several inches relative to the axle. Because the leaf springs are above the axle, they are able to flatten more during compression and may twist more to increase articulation. However, the amount of articulation is still limited by the amount of twist of the leaf springs. Also, the increased ability of the leaf spring to twist and the raised center of gravity reduces the lateral stability of the vehicle.

Another more complicated approach, known as a "¾ elliptical" suspension, uses the spring over suspension, leaving the leaf springs unattached to the axle. Instead, a long arm is pivotally connected at the outer end of the vehicle and extends to rest under the axle. A shorter arm connected to the longer arm extends to suspend above the axle. As with the four link system, the leaf springs provide compression and the arms can be adjusted to provide little or no pressure, resulting in very large amounts of droop if both sides of the axle are required to droop. Articulation is increased, but still is limited by the twist or flex of the leaf springs.

Many other attempts have been made to increase the articulation of off road vehicles, particularly leaf spring assemblies of four wheel drive vehicles and all terrain vehicles. Nonetheless, a need exists for a new or modified leaf spring assembly and method to increase articulation, while decreasing the lateral twisting forces of the leaf springs. A further need exists to provide such an assembly and method that is sufficiently stable to allow the vehicle to be driven both off road and on road.

SUMMARY

The present invention is directed to a structure and method for increasing articulation of a vehicle. In one embodiment of the invention, a shackle comprises a first section having a proximal end and a distal end for connection to a vehicle, a second section having a proximal end connected to the proximal end of the first section and a distal end, a third section having a proximal end rotatably connected to the distal end of the second section and a distal end for connection to a suspension assembly of the vehicle.

A further embodiment of the invention is directed to a shackle for suspension assemblies in vehicles comprising a first section having a first leg, a second leg and a piece connecting he first and second legs. The first and second legs each comprise a distal end for connection to the frame of a vehicle and a proximal end that is rotatably connected to the proximal end of a second section. The second section further comprises a cylindrical distal end that is rotatably connected to the cylindrical proximal end of a third section. The third section also comprises a distal end for connection to the suspension assembly of the vehicle.

Yet another embodiment of the invention comprises a method for articulating a vehicle comprising rotating at least part of the suspension in a direction substantially parallel to the axle of the vehicle.

DETAILED DESCRIPTION

Figure 1:
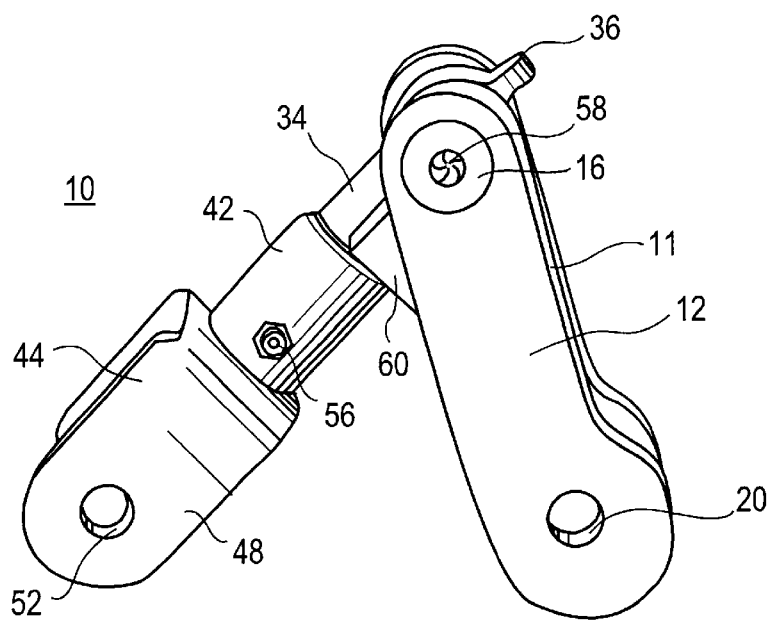
FIG. 1 is a side view of a rotating shackle in a closed position.
Figure 2:
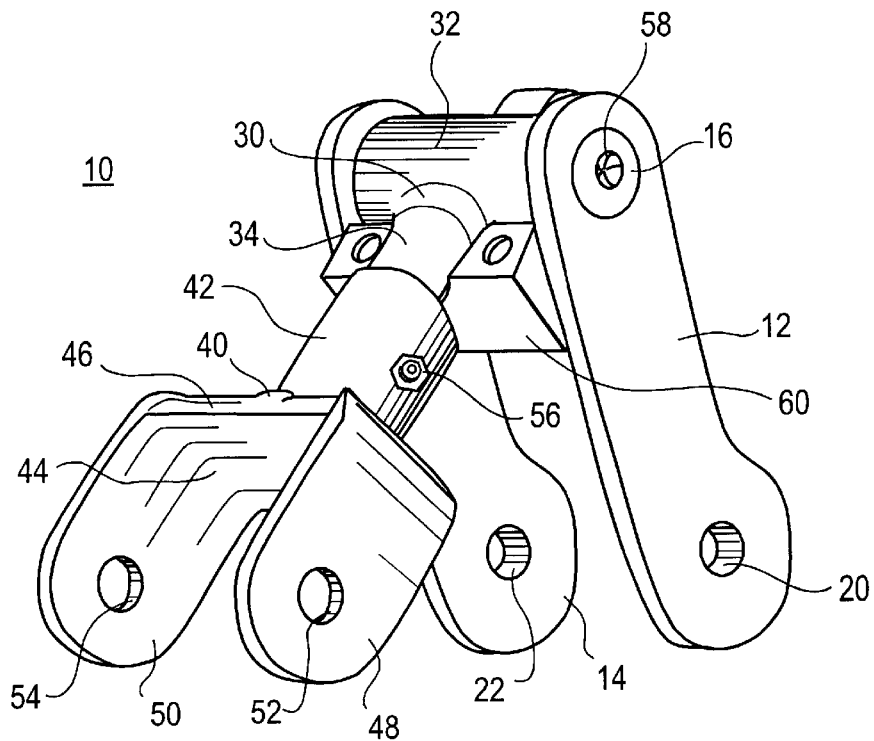
FIG. 2 is a perspective view of the rotating shackle shown in FIG. 1.
Figure 3:
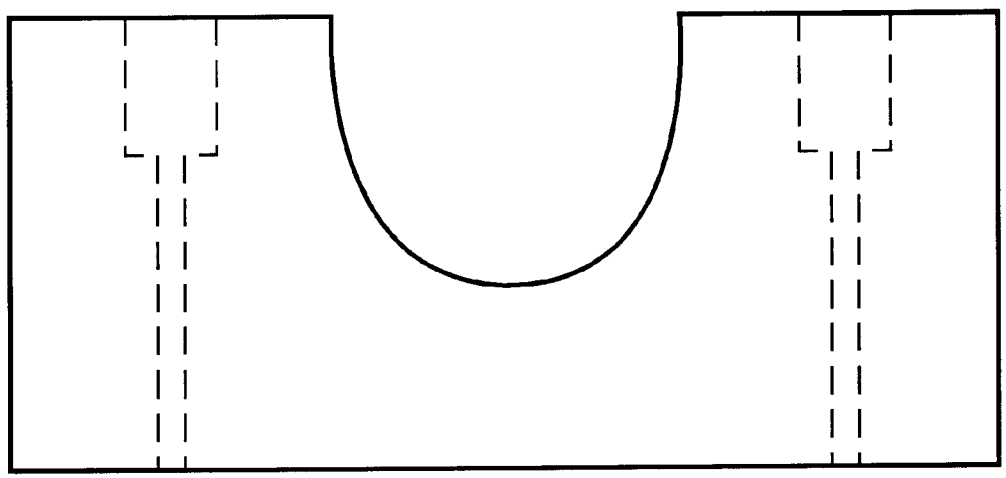
FIG. 3 is a front plan view of a bushing for the rotating shackle shown in FIG. 1.
Figure 4:
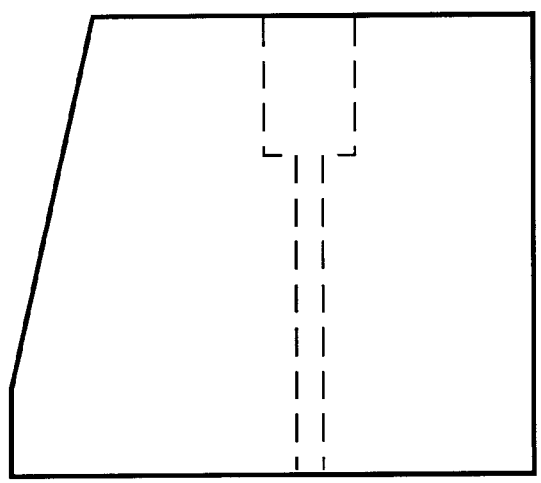
FIG. 4 is a side plan view of the bushing shown in FIG. 3.

One embodiment of the present invention is shown in FIGS. 1–5. A rotating shackle 10 comprises a first section 11, a second section 30 and a third section 40, each of which have a distal end and a proximal end, and a bushing 60. Generally, the first section 11 has a distal end for connection to the frame of a vehicle and a proximal end for connection to the proximal end of the second section 30. Both of these preferably are pivoting connections, as set forth in more detail below. The third section 40 has a proximal end rotatably connected to the distal end of the second section 30 and a distal end for connection, preferably a pivoting connection, to a suspension assembly of the vehicle. The size, shape, dimensions, materials, number and configuration of the sections and other variations and details of the shackle 10 depend on, among other things, the configuration of the suspension system and vehicle on which it is to be used, as would be recognized by one of ordinary skill in the art.

Figure 12:
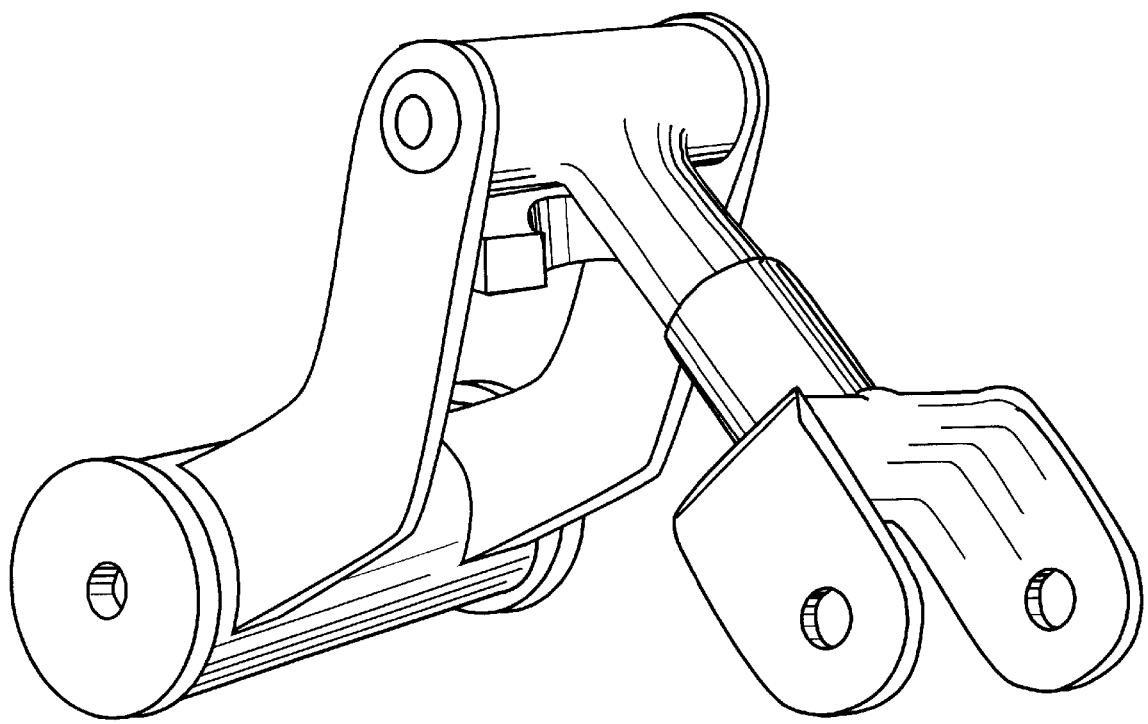
FIG. 12 is a perspective view of an alternative embodiment of a rotating shackle in a partially open position to show a bushing.

The embodiment shown in FIGS. 1–5 is specifically designed for use with Jeep brand YJ and CJ models manufactured from about 1976 to about 1996. Similar or alternative embodiments will work for vehicles from many other manufacturers, including Toyota, Isuzu, Suzuki and International Harvester. For example, FIG. 12 shows an alternative embodiment of the invention for installation on a Jeep brand XJ model manufactured since about 1984. Similar or alternative embodiments also will work for other types of vehicles, such as all terrain vehicles.

As shown in FIGS. 1–5, the first section 11 preferably comprises a first leg 12 having a hole 20 at a distal end and a hole 16 at a proximal end, a second leg 14 having a hole 22 at a distal end and a hole (not shown) at a proximal end, and a plate 24 connecting the first leg 12 and the second 14. The second section 30 comprises a base 32, a neck 34 and preferably an over extension stop 36. The third section 40 comprises a neck 42 and a U-shaped member 44, which further comprises a base 46, a bolt 47, a first flange 48 having a hole 52, a second flange 50 having a hole 54, and a port 56.

The first section 11 comprises holes 20, 22 to allow the shackle 10 to be connected to the vehicle, preferably by fastening a bolt through each of holes 20, 22 and through the stock holes on the bottom side of the vehicle located approximately above the spring eye of the leaf spring assembly. Alternatively, first section may be connected with other types of connector known in the art. Most preferably, the first section 11 is allowed to pivot about this connection with the vehicle.

The first leg 12 and the second leg 14 are preferably fabricated from 5/16 inch mild steel and are preferably approximately the same dimensions. For example, the preferred length of both legs 12 and 14 is about 4 inches to about 5¼ inches from the center of hole 16 to the center of hole 20, depending on the vehicle. For the Jeep Brank CJ, the legs 12 and 14 will be about 4 inches in this dimension. The plate 24 is preferably mild steel approximately ½ inch deep by 1 inch wide and welded to the first leg 12 and to the second leg 14 about 1 inch below the center of hole 16 and the corresponding hole (not shown) of the second leg 14. The length of plate 24, and therefore the distance between the first leg 12 and the second leg 14, must be sufficient to accommodate the width of the leaf springs. Typically, the leaf springs installed on recreational off road vehicles vary from about 2 inches to about 2½ inches in width and the plate 24 preferably is about½ inch longer than the width of the leaf springs. In Jeep brand YJ model, the leaf springs are about 2½ inches wide and the preferred length of the plate 24 is about 3 inches.

If present, first section 11 may take any number of alternative configurations, including a solid single piece, that provide a connection, preferably pivoting, to the rotating portion of the shackle 10 and another connection, preferably pivoting, to the frame of the vehicle. Variations of materials, including other metals, alloys, composites and polymers, as well as variations of dimensions and configurations, would be recognized by one of ordinary skill in the art.

The second section 30 comprises a base 32 to connect the second section 30 to the first section 11. Although this connection may fixed, preferably it is pivoting. Preferably, the base 32 spans substantially the entire distance between the first leg 12 and the second leg 14 and comprises an opening to insert a pin 58, bolt or other fastener through the first leg 12, the base 32 and the second leg 14 to provide a pivotal connection.

The second section 30 also preferably comprises a neck 34 extending from the base 32. Most preferably, second section 30 is generally T-shaped, with base 32 and neck 34 being welded together. Preferably, base 32 is a hollow cylinder formed of drive line or D.O.M. (drawn over mandrel) tubing, with a 1 inch inside diameter and a 1¼ inch outside diameter, and neck 34 has a 1 inch outside diameter and a ½ inch threaded hole approximately 2⅛ inch deep. Variations of materials, including other metals, alloys, composites and polymers, as well as variations of dimensions and configurations, would be recognized by one of ordinary skill in the art.

The third section 40 comprises a generally cylindrical neck 42 fixed, preferably by welding, to a U-shaped member 44. The neck 42 of the third section 40 has at least a slightly larger inside diameter than the outside diameter of the neck 34 of the second section 30, preferably about 0.003 inch to about 0.005 inch larger. Most preferably, the neck 42 of the third section 40 is fabricated of drive line or D.O.M. (drawn over mandrel) tubing having a 1 inch inside diameter and a 1 5/16 inch outside diameter. Port 56 may be added to introduce grease or other lubricants to the interior surface of neck 42. Variations of materials, including other metals, alloys, composites and polymers, as well as variations of dimensions and configurations, would be recognized by one of ordinary skill in the art.

Figure 5:
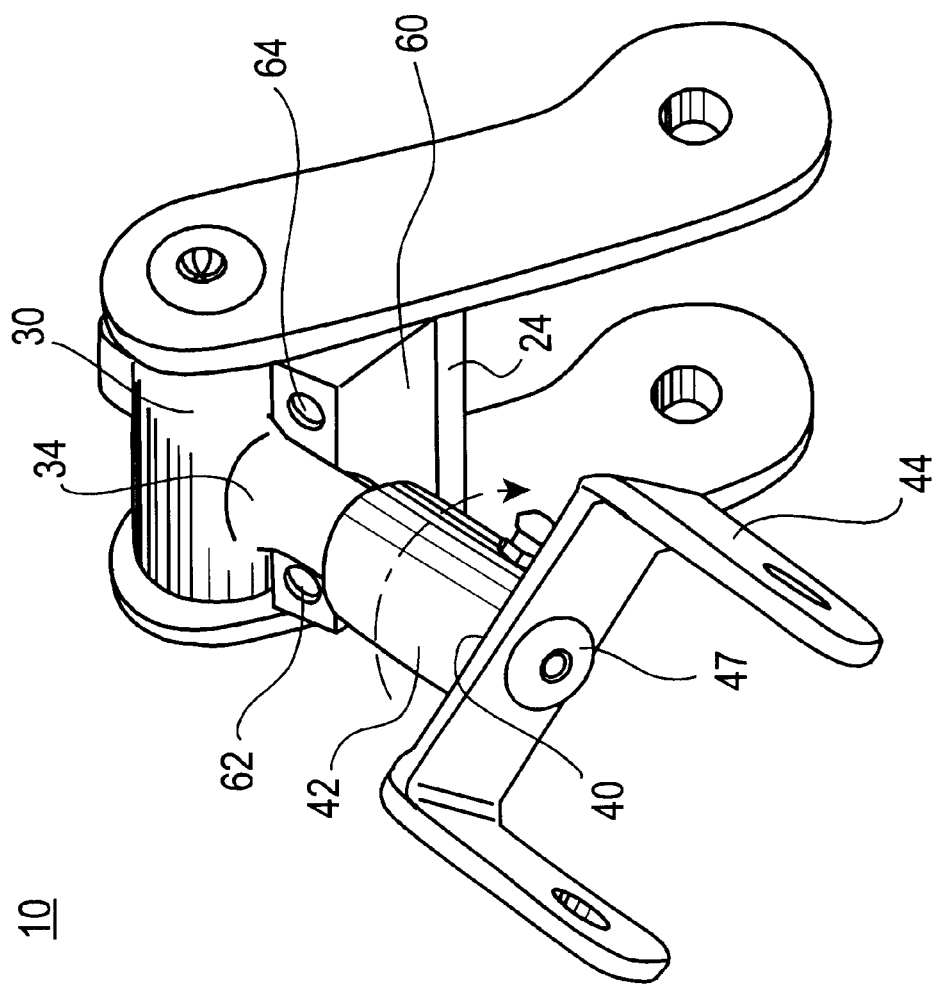
FIG. 5 is a perspective view of the rotating shackle shown in FIG. 1 showing rotation of the shackle while in a closed position.
Figure 6:
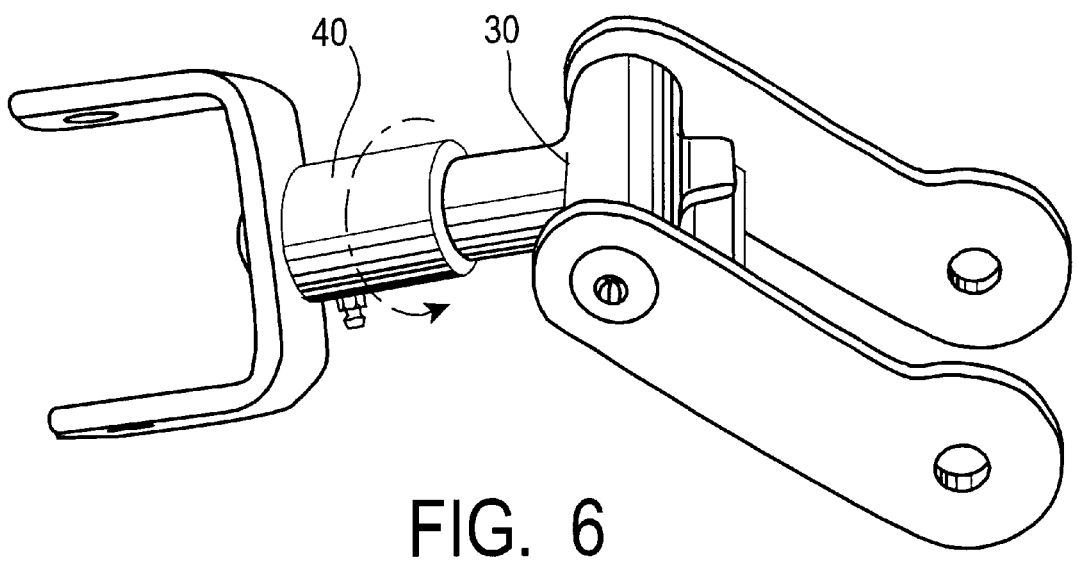
FIG. 6 is a perspective view of the rotating shackle shown in FIG. 1 showing rotation of the shackle while in an open position.
Figure 7:
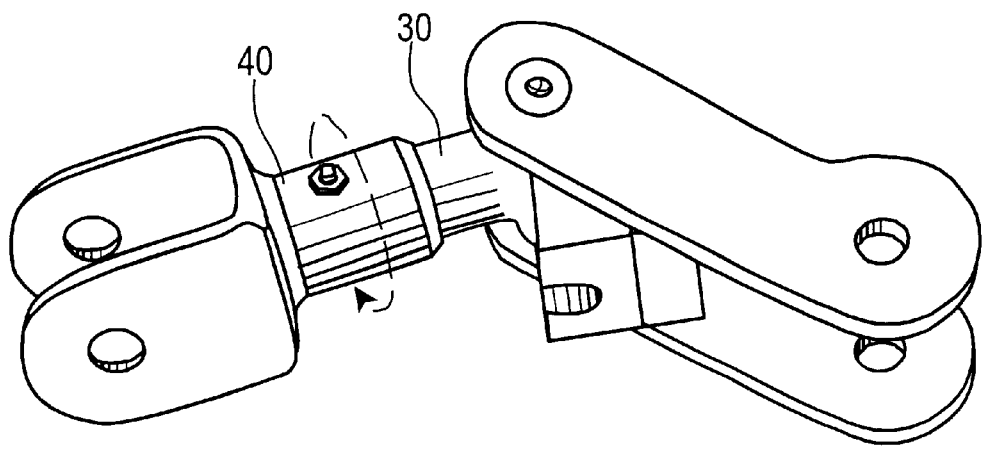
FIG. 7 is a perspective view of the rotating shackle shown in FIG. 1 showing rotation of the shackle while in an open position.

Referring particularly now to FIG. 5, the neck 34 of the second section 30 is generally cylindrical and is fitted for at least partial insertion into the generally cylindrical neck 42 of the third section 40. Bolt 47 preferably rotatably connects the U-shaped member 44 of the third section 40 to a threaded hole in the neck 34 of the second section 30. Most preferably, bolt 47 is about ½ inch by 1½ inch long. The connection allows the third section 40 to rotate relative to the second section 30.

The U-shaped member 44 comprises a first flange 48 having hole 52 and a second flange 50 having hole 54 for connecting the shackle 10 to the spring eye of the suspension system. Preferably, a bolt or pin or similar fastener is used to allow the third section 40 to pivot about this connection. The holes 52 and 54 preferably are sized and located for connection at or near the stock, or standard manufactured, location of the leaf spring assembly. The U-shaped member 44 may have an alternative size, shape or configuration, even one that is not U-shaped, depending on the suspension system that is to be connected, preferably by a pivoting connection. To the shackle 10.

The distance between the first flange 48 and the second flange 50 should be sufficient to accommodate the width of the leaf spring, and preferably is about the same distance as that between the first leg 12 and the second leg 14 of the first section 11. The U-shaped member 44 is preferably fabricated by bending a single piece of mild steel about ¼ inch deep and about 1¾ inch wide to form the base 46, the first flange 48 and the second flange 50.

As shown in FIGS. 1–5, shackle 10 further comprises a bushing 60, sized to fit between the first leg 12 and the second leg 14, as well as between the plate 24 and the neck 34 of the second section 30 when the shackle 10 is in the closed position. To accommodate the shape of the neck 34 and thereby support the second section 30 when the shackle 10 is in a closed position, the bushing 60 preferably has a semi-circular cutout having about a 1 inch diameter. The bushing 60 is fixed in place by bolts 62 and 64, which extend through the bushing 60 and into the plate 24. Most preferably, bushing 60 comprises a Delrin brand polymer block having a ¼ inch hole, with a ⅜ inch countersink, for bolts 62 and 64, and also a slight taper of about 25 degrees from the side view, on which the neck 34 may rest. The bushing 60 may be fabricated from a variety of materials, and preferably is fabricated of resilient and durable polymers such as nylon, Teflon brand polymer, urethane, or Delrin brand polymer. Most preferably, bushing 60 is constructed of Delrin brand polymer, a polymer mix of nylon and Teflon brand polymer manufactured by U.S. Plastic of Lima, Ohio.

Figure 8:
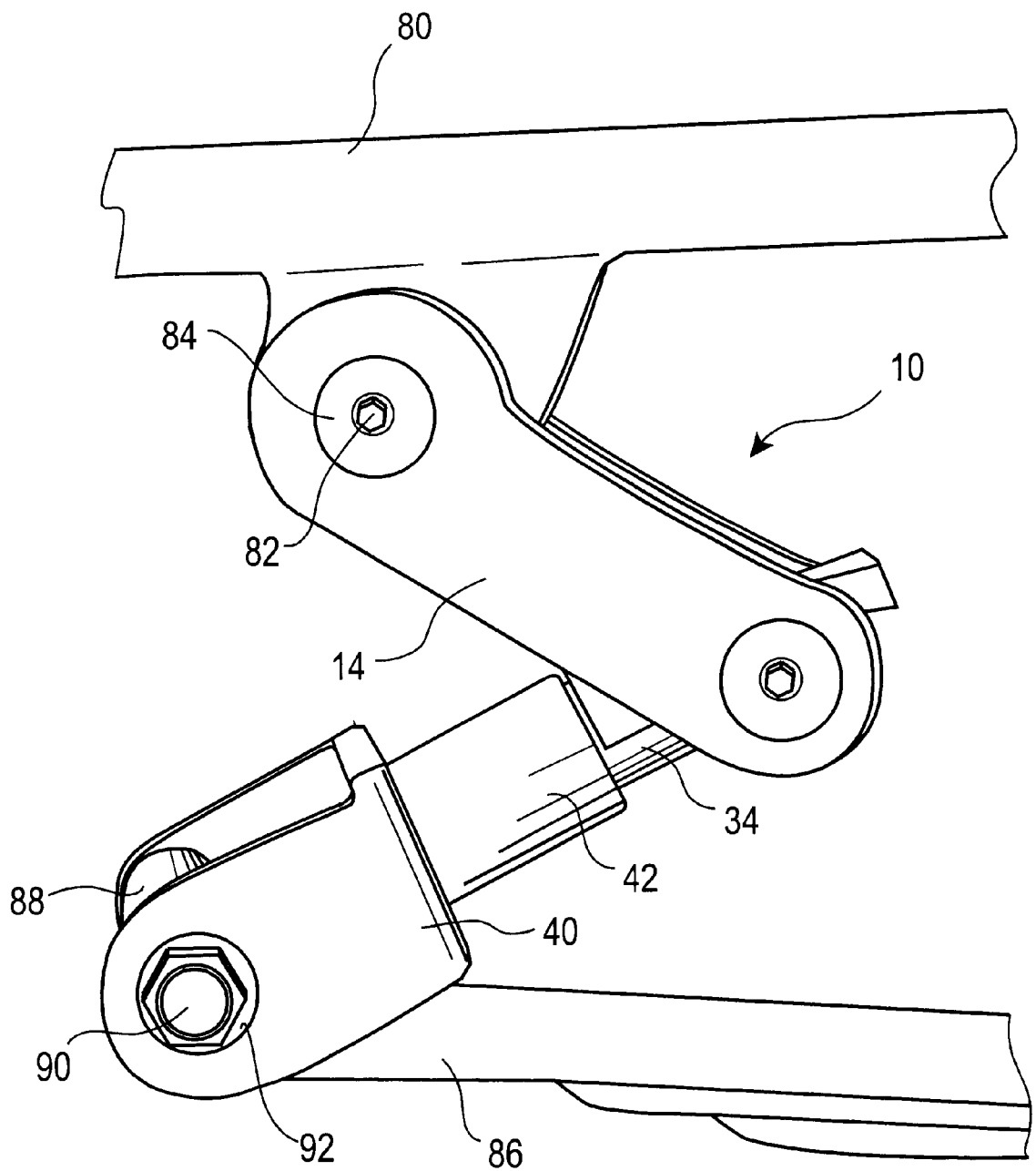
FIG. 8 is a side view of the rotating shackle shown in FIG. 1 in a closed position and connected to a vehicle and to a leaf spring suspension assembly.

Now referring to FIG. 8, a revolving shackle 10 is shown installed on a vehicle. The first section 11 is attached to frame 80, preferably by bolt 82 and washer 84. The third section 40 is attached to spring eye 88 of the leaf spring assembly 86, preferably by bolt 90 and washer 92. When the vehicle is at rest, the shackle is in a "closed position," as shown in FIG. 8. The first section 11 typically will extend back toward the axle. The second section 30 and the third section 40 typically will extend away from the axle, forming an acute angle with the first section 11. The weight of the vehicle presses the first section 11, particularly the plate 24, and the bushing 60 onto the neck 34 of the second section 30. In this way, the shackle 10 is self-supporting, i.e., the shackle 10 contacts the frame of the vehicle only where it connects with the first section 11 and contacts the suspension system only where it connects with the third section 40.

The shackle 10 could be installed such that there is little or no pivoting movement at any of the connections 1) between the first section 11 and the frame 80, 2) between the first section 11 and the second section 30 and 3) between the third section 40 and the spring eye 88. If the leaf spring 86 were required to droop or compress in a vertical direction only, the leaf springs would be forced to provide the extension for the droop and the upward/forward movement for the compression.

However, in actual operation, there is typically a significant lateral component to such droop and compression, and particularly so in rock crawling, when one side of the axle compresses, and the other side does not compress as much, does not compress at all, or is required to droop. Then the third section 40 of the shackle 10 rotates relative to the second section 30, which allows the spring eye 88 of the leaf spring assembly 86 to remain essentially in its resting position, approximately parallel to the axle. From full compression, even with a negative arch, to fully extend droop, the rotating shackle 10 allows the spring eye 88 to remain essentially in its resting position.

Rotating the third section 40 of the shackle 10 results in significantly greater articulation, as articulation is no longer limited by the twist or flex of the spring leaves. Instead, the rotating shackle 10 provides the articulation, minimizing the twist or flex of the leaf spring assembly 86 and leaving the leaf spring assembly 86 to provide the vertical movement of the suspension. By maintaining the resting position of the spring eye 88, rotating the shackle 10 also reduces metal fatigue, and thereby increases the life, of the leaf spring assembly 86.

Figure 9:
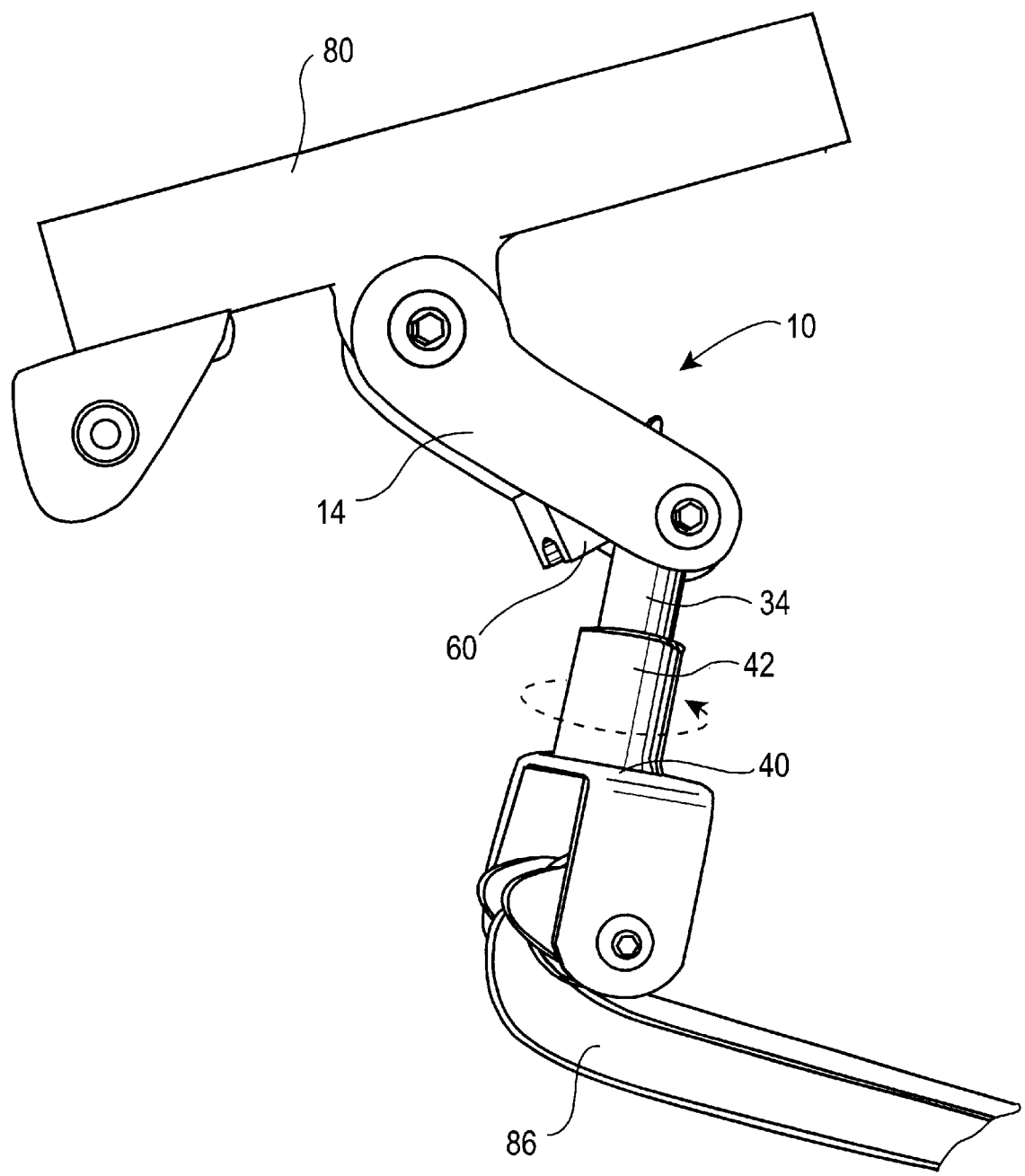
FIG. 9 is a side view of the rotating shackle shown in FIG. 1 in an open position and connected to a vehicle and to a leaf spring suspension assembly.

Preferably, the shackle 10 comprises a pivotal connection between the first section 11 and the second section 30, and most preferably also comprises pivotal connections between the first section 11 and the frame 80, as well as between the third section 40 and the spring eye 88. As shown in FIG. 9, when the leaf spring assembly 86 is required to droop, the shackle 10 then is allowed to "open." Rotating the shackle 10 on both the compression and droop sides of the axle, coupled with opening the shackle 10, greatly increases articulation of the vehicle.

Because the rotating shackle 10 is self-supporting, the leaf spring assembly 86 is able to start compression earlier, resulting in a softer action and a more comfortable ride. For example, as can be seen from FIG. 8, on initial compression of the suspension, the shackle 10 can close slightly, compressing the bushing 60 and allowing the leaf spring 86 to start to move before the leaf spring 86 starts to straighten out. This results in a quicker spring action and a better ride.

Figure 10:
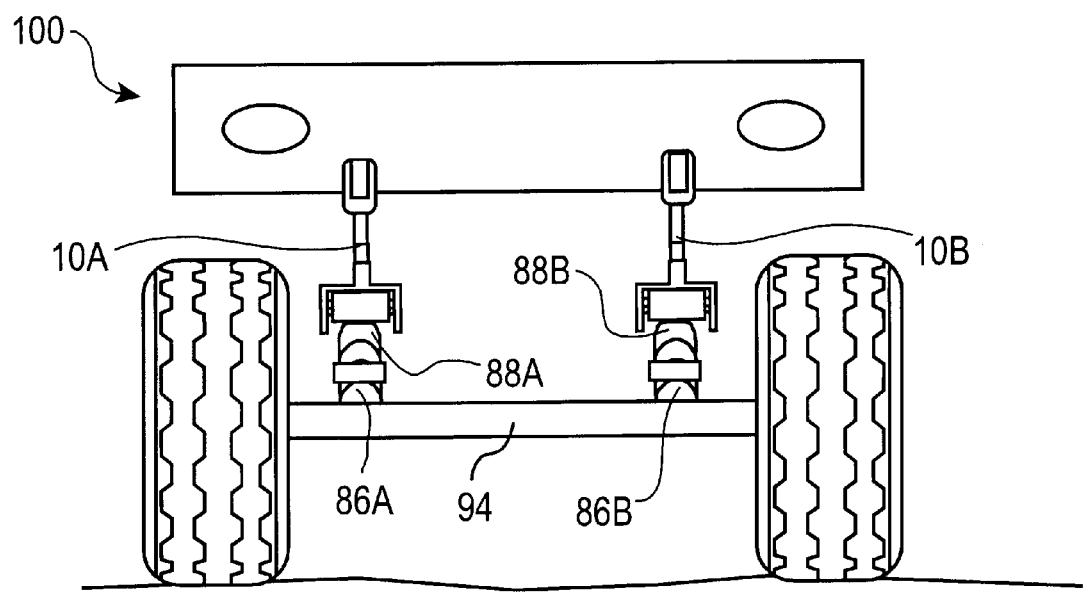
FIG. 10 is a back view of a vehicle having rotating shackles, in closed, non-rotating positions, connected to its frame and to its leaf spring suspension assemblies.

Referring now to FIG. 10, shackles 10A, 10B are installed on the frame 80 of vehicle 100 and to spring eyes 88A, 88B of leaf spring assemblies 86A, 86B, respectively. Vehicle 100 is at rest on level ground, with no compression, other than the weight of the vehicle, and no droop on either side of axle 94. Base 32 of the second section 30 is essentially parallel to spring eye 88, as well as to the leaves of the leaf spring assembly 86 and the axle 94. That is, there is little or no twist or flex of the leaf spring assembly 86 in this position, which is the "resting" position of spring eye 88.

Figure 11:
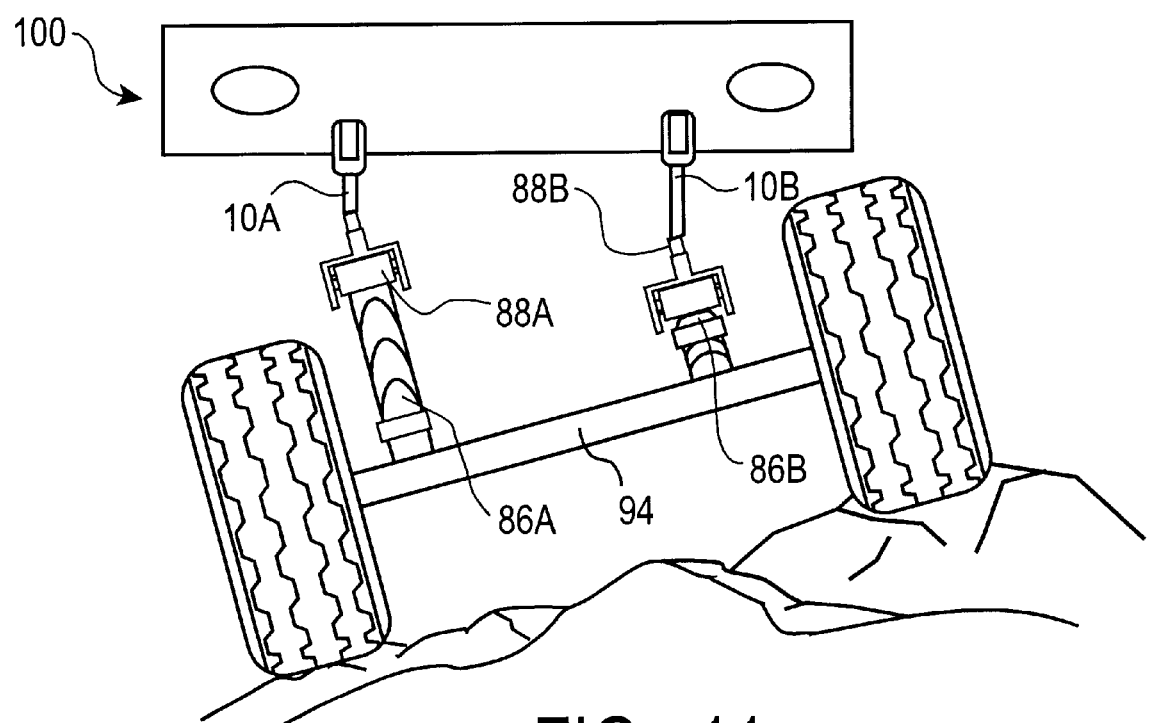
FIG. 11 is a back view of a vehicle having rotating shackles, one in an open, rotating position and the other in a closed, rotating position, connected to its frame and to its leaf spring suspension assemblies.

Vehicle 100 is then subjected to being driven onto an uneven surface, as shown in FIG. 11. Leaf spring assembly 86B compresses to accommodate the higher terrain and shackle 10B rotates, maintaining the spring eye 88B essentially in its resting position. This minimizes the pressure on, and therefore the twist or flex of, the leaves of the leaf spring assembly 86B.

At the same time, the lower terrain on the other side of the axle 94 requires that the axle 94 droop from the vehicle frame 80. Shackle 10A rotates and opens, allowing the axle 94 to droop. If additional droop is required, the leaf spring assembly 86A extends the droop further. Again, the rotation of the shackle 10A allows the spring eye 88A to remain essentially in its resting position, which minimizes the twist or flex on the leaf spring assembly 86A. In contrast, in a conventional leaf spring assembly, the droop side leaf spring will rotate laterally with the axle, thereby limiting the amount of articulation by the twist or flex of the leaf springs.

The rotation of the compression side shackle 10B is an important element in the ability of the droop side shackle 10A to fully open and to fully droop. On the compression side of the vehicle 100 during articulation, the compression side shackle 10B rotates and allows the compression side leaf spring 86B to stay essentially parallel to the axle 94, which will bring the compression side wheel into its wheel well. In turn, this allows the suspension system to increase the angle between the vehicle frame 80 and the axle 94, allowing the vehicle to droop further on the droop side.

The rotating shackle 10 has improved lateral stability, particularly for higher speed and on road use, over other designs to increase articulation. During such driving conditions, the shackle 10 is in a closed position, with the vehicle weight supported by the shackle 10, including the bushing 60. The primary lateral movement of the suspension system is in the bushings of the frame 80 and spring eye 88.

The rotating shackle of the present invention may take other forms in addition to those described herein. For example, the first section 11 may be essentially omitted or combined with second section 30 or third section 40, as long as at least a portion of the shackle, or other structural piece, rotates to assist the spring eye 88 in remaining substantially in a resting position or substantially parallel to the rest of the leaf spring and the axle. The size, shape, dimensions, materials, number and configuration of the sections and other variations and details of the shackle 10 depend on, among other things, the configuration of the suspension system and vehicle on which it is to be used, as would be recognized by one of ordinary skill in the art.

The foregoing description of the present invention has been presented for purposes of illustration and description. The description is not intended to limit the invention to the forms disclosed herein. Consequently, variations and modifications commensurate with the above teachings, and the skill or knowledge of the relevant art, are within the scope of the present invention. The embodiments described herein are further intended to explain the best mode known for practicing the invention and to enable others skilled in the art to utilize the invention in such, or other, embodiments and with various modifications required by the particular applications or uses of the present invention. It is intended that the appended claims be construed to include embodiments to the extent permitted by the prior art.

I claim:

1. A shackle for use with a vehicle having a suspension system, the shackle comprising:
   a) a first section having a distal end and a proximal end, the distal end adapted to connect to the vehicle;
   b) a second section having a distal end and a proximal end, the distal end of the second section pivotally connected to the proximal end of the first section, the first and second sections rotating relative to one another about a transverse axis of rotation; and
   c) a third section having a distal end and a proximal end, the distal end of the third section adapted to connect to the suspension system, the proximal end of the third section rotatably connected to the second section, the second and third sections being in line with one another and rotating about a shared longitudinal axis.

2. The shackle according to claim 1, wherein the axis of rotation between the second and third sections is approximately perpendicular to the axis of pivot between the first and second sections.

3. The shackle according to claim 1, wherein the distal end of the first section is adapted to pivotally connect to the vehicle.

4. The shackle according to claim 1, wherein the distal end of the third section is adapted to pivotally connect to the suspension system.

5. The shackle according to claim 1, wherein the first section includes first and second legs positioned parallel to one another; the proximal end of the second section is formed as a base extending between the proximal ends of the first and second legs; and a pin passes through the first leg, the base, and the second leg so as to form the transverse pivot axis, the base rotating about the pin and about the proximal ends of the first and second legs.

6. The shackle according to claim 1, wherein the distal end of the second section is formed as a cylindrical neck, the proximal end of the third section being formed as a tubular cylindrical neck in which the neck of the second section rotates therewithin.

7. The shackle according to claim 1, wherein the distal end of the third section is formed as a U-shaped member having spaced-apart first and second flanges interconnected by a base member, the proximal end of the third section being formed as a tubular neck connected to the base member, the tubular neck being shaped to receive the distal end of the second section therewithin.

8. The shackle according to claim 1, wherein the shackle includes an open position and a closed position, the closed position having the first and second sections rotated toward one another, and the open position having the first and second sections rotated away from one another; and wherein the first section includes a bushing secured to the proximal end of the first section; the bushing engaging the proximal end of the second section when the shackle is in the closed position.

9. The shackle according to claim 8, wherein the second section further includes an overextension stop located at the proximal end of the second section, the stop abutting the bushing when the second section approaches a position longitudinally in line with the first section.

10. The shackle according to claim 8, wherein the first section includes first and second parallel legs and the bushing is located therebetween.

11. The shackle according to claim 8, wherein the bushing includes an arcuate channel and the distal end of the second section includes a cylindrical neck, wherein, in the closed position, the cylindrical neck is positioned within the arcuate channel.

12. A shackle for use with a vehicle having a suspension system, the shackle comprising:
   a) a first section having a distal end and a proximal end, the first section including first and second legs positioned parallel to one another;
   b) a second section having a distal end and a proximal end, the distal end of the second section pivotally connected to the proximal end of the first section, the first and second sections rotating relative to one another about a transverse axis of rotation; the proximal end of the second section being formed as a base extending between the proximal ends of the first and second legs; a pin passing through the first leg, the base, and the second leg so that the base rotates about the pin; and
   c) a third section having a distal end and a proximal end, the proximal end of the third section being rotatably connected to the second section, the second and third sections being in line with one another and rotating about a shared longitudinal axis; the distal end of the second section being formed as a cylindrical neck, the proximal end of the third section being formed as a tubular cylindrical neck within which the neck of the second section rotates; the distal end of the third section being formed as a U-shaped member having spaced-apart first and second flanges interconnected by a base member, the tubular cylindrical neck extending from the base member.

13. The shackle according to claim 12, wherein the shackle includes an open position and a closed position, the closed position having the first and second sections rotated toward one another, and the open position having the first and second sections rotated away from one another; and wherein the first section includes a bushing secured to the proximal end of the first section; the bushing engaging the proximal end of the second section when the shackle is in the closed position.

14. The shackle according to claim 13, wherein the bushing is located between the proximal ends of the first and second legs.

15. The shackle according to claim 13, wherein the second section further includes an overextension stop located at the proximal end of the second section, the stop abutting the bushing when the second section approaches a position in line with the first section.

* * * * *